United States Patent [19]

Ingman

[11] Patent Number: 4,658,345
[45] Date of Patent: Apr. 14, 1987

[54] AUTOMATIC SWITCHOVER CIRCUIT

[75] Inventor: Thomas M. Ingman, Somis, Calif.

[73] Assignee: Condor, Inc., Oxnard, Calif.

[21] Appl. No.: 799,462

[22] Filed: Nov. 19, 1985

[51] Int. Cl.$^4$ .............................................. H02M 7/04
[52] U.S. Cl. ..................................... 363/143; 363/126
[58] Field of Search ....................... 363/126, 142, 143; 323/299, 300, 303, 902

[56] References Cited

U.S. PATENT DOCUMENTS

| | | | |
|---|---|---|---|
| 3,979,644 | 9/1976 | Everhart | 363/53 |
| 4,148,088 | 1/1981 | Meroni | 363/50 |
| 4,383,212 | 5/1983 | Ballman | 323/902 |

FOREIGN PATENT DOCUMENTS

| | | | |
|---|---|---|---|
| 162881 | 12/1980 | Japan | 363/143 |
| 46675 | 3/1982 | Japan | 363/143 |
| 67873 | 4/1984 | Japan | 363/143 |

OTHER PUBLICATIONS

IBM Technical Disclosure Bulletin, vol. 28, No. 3, Aug. 1985, pp. 1246 and 1247.

*Primary Examiner*—Peter S. Wong
*Assistant Examiner*—Judson H. Jones
*Attorney, Agent, or Firm*—David B. Newman, Jr.

[57] ABSTRACT

A circuit for automatically operating a switching power supply is capable of operating from first and second input voltage ranges. The circuit changes the switching power supply from a full-wave rectifier circuit to a voltage doubler rectifier circuit by electrically connecting first and second nodes. The circuit includes a rectifier circuit and a voltage level sensing device for generating an output voltage to trigger a triac, which connects the first and second nodes.

16 Claims, 3 Drawing Figures

AUTOMATIC SWITCHOVER CIRCUIT

BACKGROUND OF THE INVENTION

This invention relates to switching type power supplies, and more particularly to power supplies capable of operating from two input voltage ranges and automatically converting a power supply rectifier circuit to operate from either of those ranges.

DESCRIPTION OF THE PRIOR ART

Switching power supplies have a requirement for operating from two AC input voltage ranges. This requirement arises from the variations in the AC voltage power line levels which exist throughout the world. Typically, only two such input voltage ranges are required: a first input voltage range, 90-132 volts; and a second input voltage range, 180-264 volts.

In the prior art, switching power supplies were designed to operate from these input voltage ranges by having a power supply rectifier circuit capable of operating from either of these ranges. The prior art achieved this capability by using a manual jumper or switch for connecting first and second nodes in the switching power supply. The jumper or switch was capable of converting the switching power supply from a first rectifier circuit for operating from the first input voltage range when the first and second nodes were electrically connected, to a second rectifier circuit for operating from the second input voltage range when the first and second nodes were not electrically connected.

FIG. 1 shows a particular embodiment of a switching power supply 20 capable of operating from two input voltage ranges. Switching power supply 20 includes a rectifier and filter circuit and inverter circuit 350. Input AC voltage line 75 is connected to diodes D2, D1 and D3, D4, respectively. With an optional jumper 15 removed from first and second nodes 8, 9, diodes D1, D2, D3, D4 operate as a full-wave rectifier circuit. Capacitors C1, C2, C3 and resistors R1, R2 operate as a filter of the output rectified voltage from the full-wave rectifier circuit. The full-wave rectifier circuit is connected to inverter circuit 350 for producing DC output. Accordingly, the switching power supply 20 with the optional jumper 15 removed from first and second nodes 8, 9 would operate from an input AC voltage in the second input voltage range, 180-264 volts, for example.

With the optional jumper 15 connected to first and second nodes 8, 9, diodes D1, D2, D3, D4, capacitors C1, C2 and resistors R1, R2 are connected to operate as a voltage doubler rectifier circuit. Capacitor C3 is a filter capacitor. The voltage doubler rectifier circuit is connected to inverter circuit 350. Thus, the switching power supply 20 with the optional jumper 15 inserted between first and second nodes 8, 9 would operate from an input AC voltage in the first input voltage range, 90-132 volts, for example.

A particular example of the circuit in FIG. 1 might have the following values for a first voltage range of 115 volts and a second voltage range of 230 volts: 1N4005 diode for D1, D2, D3, D4; 470 microfarad capacitor for C1, C2 and a 100 microfarad capacitor for C3; 160K resistors for R1, R2.

A problem with the prior art switching power supply is that a user of the power supply might connect the power supply to an input AC voltage line with the second input voltage voltage range, for example 230 volts, and at the same time have the jumper inserted for operating the power supply from the first input voltage range. This would result in a higher voltage being applied to the voltage doubler rectifier circuit, filter capacitors and inverter switching circuitry than for which the circuit is designed.

Another disadvantage of using the switching type power supply with a manual jumper or switch is that an user of the switching type power supply will have to ensure that the jumper or switch is properly set for correct operation of the power supply.

OBJECTS AND SUMMARY OF THE INVENTION

An object of the present invention is to provide a circuit capable of operating a switching power supply without the use of a mechanical jumper or mechanical switch.

Another object of the present invention is to provide a circuit for operating a switching power supply which is simple and low cost.

A further object of the present invention is a reliable switching power supply capable of operating under normal and abnormal conditions.

According to the present invention, as embodied and broadly described herein, a circuit for automatically operating a switching power supply is provided comprising rectifying means coupled to an input AC voltage line, level sensing means coupled to the rectifying means, triac means coupled to the level sensing means and delay means connected between the rectifying means and the level sensing means. The rectifying means, level sensing means, triac means and delay means may be embodied as a third rectifier circuit, a transistor voltage level sensing circuit, a triac, and a capacitor and a resistor connected in parallel, respectively. The present invention can also include isolation means coupled between the level sensing means and the triac means. The isolation means may be embodied as an optically isolated triac driver.

The switching power supply is capable of operating from first and second input voltage ranges by having the circuit automatically electrically connect or not connect first and second nodes for changing the switching power supply from a first rectifier circuit for operating from the first input voltage range when the first and second nodes are electrically connected, to a second rectifier circuit for operating from the second input voltage range when the first and second nodes are not electrically connected.

The third rectifier circuit rectifies an AC voltage from an input AC voltage line to a DC voltage. The voltage level sensing circuit senses the voltage range of the AC voltage from the DC voltage level and generates an output voltage when the DC voltage is above a predetermined level. The optically isolated triac driver has first and second input terminals and third and fourth output terminals, with the first and second input terminals coupled to the voltage level sensing circuit. The triac has a trigger terminal coupled to the level sensing circuit and fifth and sixth terminals, which are the main terminals of the triac, connected to the first and second nodes, respectively. The triac is triggered through the optically isolated triac driver in response to the output voltage being at a high level. Accordingly, the triac electrically connects the first and second nodes in this state.

Further, the present invention can include over-voltage sensing means coupled to the input AC voltage line. The over-voltage sensing means might be used, for example, when the rectifier circuit has an output coupled to an inverter circuit. The over-voltage sensing means senses when the AC voltage exceeds an over-voltage threshold and in response generates an inhibit signal for decreasing pulse energy inputted to the inverter circuit.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
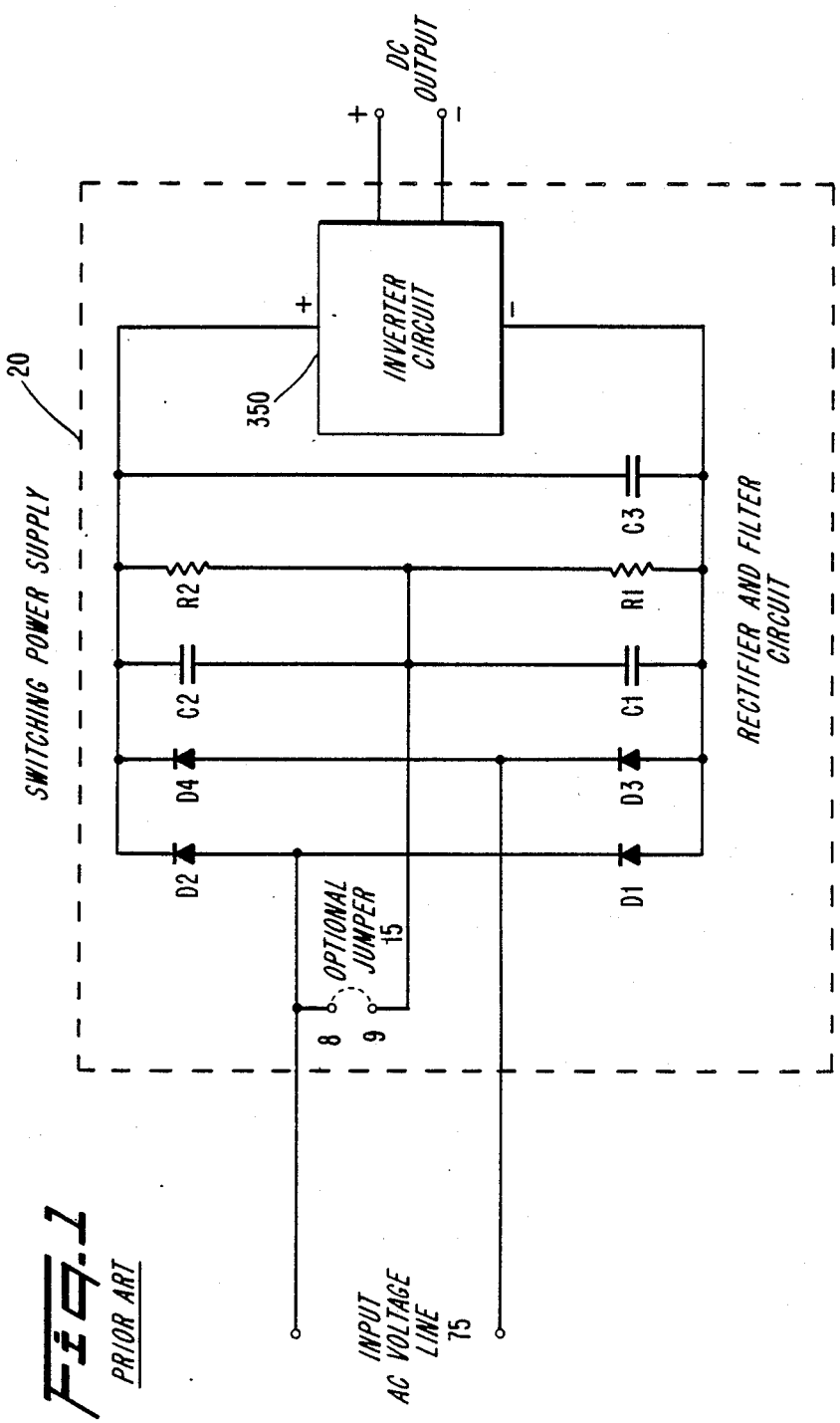
FIG. 1 is a schematic diagram of a prior art switching power supply.
Figure 2:
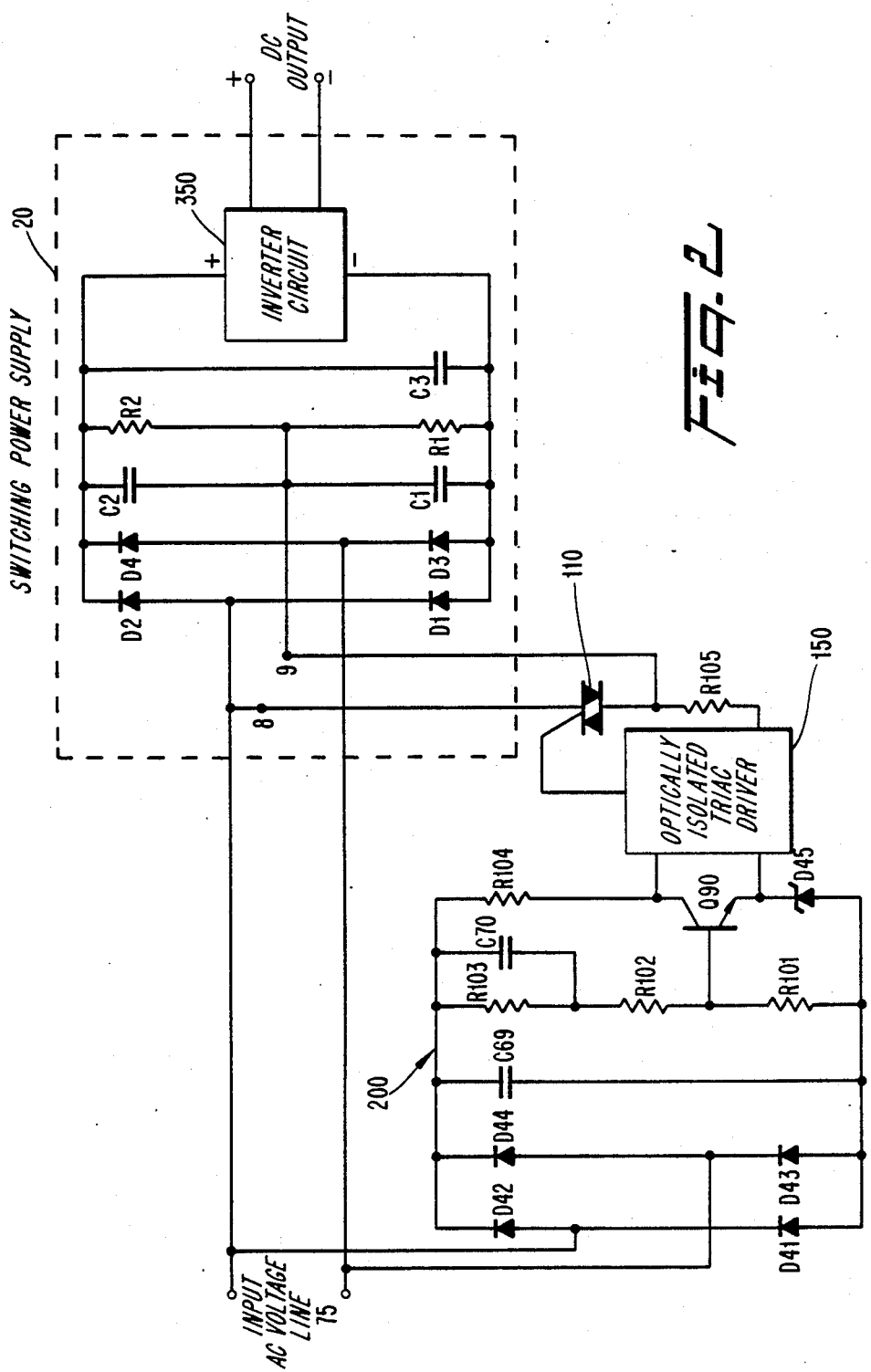
FIG. 2 is a schematic diagram of an embodiment of a circuit for automatically operating a switching power supply according to the present invention.

Referring to FIG. 2, a preferred embodiment of a circuit 200 for automatically operating a switching power supply 20 is shown comprising rectifying means, level sensing means, isolation means, triac means and delay means. The rectifying means is coupled to the input AC voltage line 75. The level sensing means is coupled to the rectifying means through the delay means. The triac means is coupled to the output of the level sensing means through the isolation means. The output of the triac means is coupled to the first and second nodes 8, 9 of switching power supply 20.

In the exemplary arrangement shown, rectifying means may be embodied as a full-wave rectifier circuit having a first diode D41 connected to a second diode D42 and a third diode D43, a fourth diode D44 connected to the second diode D42 and the third diode D43, and a filter capacitor C69 connected to third and fourth diodes D43, D44. First and second diodes D41, D42 and third and fourth diodes D43, D44 are connected, respectively, to the AC voltage line 75.

The preferred embodiment uses a full-wave rectifier circuit, as illustratively shown in FIG. 2. Other rectifier circuits, such as a half-wave rectifier circuit or the use of a single diode and filter, however, could be substituted for the full-wave rectifier circuit shown in FIG. 2 without departing from the function of the rectifying means.

The level sensing means may be embodied as a level sensing circuit having, for example, a transistor Q90 with a collector connected to the rectifier circuit through a fourth resistor R104 and an emitter connected to the rectifier circuit through zener diode D45. Transistor T90 has a base connected to first and second resistors R101, R102, with the first resistor R101 connected to the rectified circuit. The level sensing circuit can be embodied also with a field effect transistor or a bipolar transistor or any other combinations of elements which will accomplish the same function as the disclosed circuit.

The delay means may be embodied as a resistor-capacitor circuit, with a third resistor R103 connected between the second resistor R102 and the rectifier circuit, and a capacitor C70 connected in parallel with the third resistor R103.

The isolation means may be embodied as an optically isolated triac driver 150, having, first and second input terminals for an anode and a cathode, connected to the collector and emitter, respectively. The optically isolated triac driver 150 has third and fourth output terminals which correspond to the main terminals of the optically isolated triac driver 150. Optically isolated triac drivers include gallium-arsenide infrared-emitting diodes coupled to silicon bilateral switches and are designed for applications requiring isolated triac triggering.

Isolation means can be embodied also as a coupling transformer or other devices which accomplish the same function.

In the preferred embodiment the triac means includes a triac 110 having a trigger terminal and fifth and sixth terminals. As shown in FIG. 2, the triac 110 has the trigger terminal connected to the fourth output terminal of the optically isolated triac driver 150 and the fifth terminal connected through a fifth resistor R105 to the third output terminal of the optically isolated triac driver 150. The fifth and sixth terminals of triac 110 are connected to first and second nodes 8, 9 of switching power supply 20.

Although a triac is illustratively shown for triac means in FIG. 2, other devices could be substituted for the triac and accomplish the same function. For example, a pair of transistors or trigger controlled rectifier diodes could replace the triac.

The circuit 200 for automatically operating the switching power supply 20 performs the following functions. AC voltage from input AC voltage line 75 is rectified by the full-wave rectifier circuit D41, D42, D43, D44, and filtered by filter capacitor C69 to a DC voltage. This DC voltage, which is proportional to the AC voltage, is sensed by the level sensing circuit. For the embodiment shown in FIG. 2, this DC voltage is divided by first and second resistors R101, R102 and sensed by transistor Q90 in relation to reference zener diode D45. The ratio of the resistors is such that the transistor Q90 is turned on if the line voltage is in excess of 140 volts AC and turned off if the line voltage is less than 140 volts AC. When the transistor Q90 is off, current flows through the first and second terminals of the optically isolated triac driver 150. This turns on the infrared-emitting diode inside the optically isolated triac driver 150 which activates the silicon bilateral switches inside the optically isolated triac driver 150. Accordingly, the optically isolated triac driver turns on triac 110. When triac 110 is turned on, first and second nodes 8, 9 are electrically connected and the switching power supply 20 is operating in the voltage doubler rectifier circuit. Thus, the switching power supply 20 is operating from the first input voltage range.

When transistor Q90 is on, current flows from fourth resistor R104 through the transistor Q90 and not through the optically isolated triac driver 150. Accordingly, the optically isolated triac driver 150 is turned off, and consequently triac 110 is turned off and first and second nodes 8, 9 are not electrically connected. Thus, the switching power supply 20 is operating in the full-wave rectifier circuit and can operate from the second input voltage range.

During initial turn on of the circuit 200, capacitor C70 ensures that the switching power supply 20 comes on in the full-wave rectifier circuit and switches to the voltage doubler rectifier circuit if required. When the circuit 200 is initially turned on, capacitor C70 acts as a short across third resistor R103, thus raising the voltage between first and second resistors R101, R102. This voltage turns on transistor Q90, causing current to flow from the fourth resistor R104 through the transistor Q90. Accordingly, the triac is not activated and first and second nodes 8, 9 are not connected. After capacitor C70 is charged, then third resistor R103 along with first and second resistor R101, R102 set the voltage at which transistor Q90 is activated. This is the steady state condition, and the circuit 200 operates as described previously. The use of capacitor C70 eliminates over-voltage conditions of the switching power supply 20 during initial turn on.

A particular example of the circuit 200 for automatically operating a switching power supply 20 such that transistor Q90 is turned on if the line voltage is in excess of 140 volts AC and turned off if the line voltage is less than 140 volts AC, might have the following component values: 1N4005 diodes for D41, D42, D43, D44; a 4.7 microfarad filter capacitor for C69; 6.04K, 90.9K, 90.9K, 25K, and 220 ohm resistors for first, second, third, fourth and fifth resistors, respectively; a Motorola MOC3012 for optically isolated triac driver 150; a MPS2222 transistor for Q90.

The circuit for automatically operating the switching power supply as described hereto operates under normal conditions, including initial turn on and during steady state operation from either the first input voltage range or the second input voltage range, reliably without interruption. Under the normal conditions, a constant DC voltage is supplied at the output of the switching power supply.

Under what might be termed abnormal conditions, the DC voltage supplied at the output of the switching power supply can vary with possible component failure of components operating at the output of the switching power supply. Abnormal conditions might occur when the switching power supply is operating with the second rectifier circuit from an input AC voltage from the second input voltage range, for example—230 volts, and a brown out condition occurs whereby the input AC voltage drops to a level in the first input voltage range, for example—115 volts. In response to this voltage drop, the circuit 200 for automatically operating the switching power supply would convert the switching power supply from the second rectifier circuit to the first rectifier circuit. As illustratively shown in the embodiment of FIG. 2, this change would be from a full-wave rectifier circuit to a voltage doubler rectifier circuit, for example. A problem may occur when the brown out condition ends and the input AC voltage returns to a level in the second input voltage range, for example—230 volts. A triac can be turned off only during a zero current condition, not during the middle of a cycle of the input AC voltage. Accordingly, if current were flowing in the triac—an on condition—during a cycle of the input AC voltage when the input AC voltage returned to a level in the second input voltage range, the triac would stay in the on condition until the end of the cycle. This condition would produce a considerable over-voltage condition in the output of the voltage doubler rectifier circuit of the switching power supply 20 since the input AC voltage into the voltage doubler rectifier circuit of the switching power supply 20 would double while the switching power supply 20 would be operating with the voltage doubler rectifier circuit. This over-voltage could result in failure of components in the inverter circuit of the switching power supply 20. The present invention compensates for this abnormal condition with over-voltage sensing means. Further, after the occurrence of the over-voltage condition, the circuit for automatically operating the switching power supply will convert the switching power supply to the second rectifier circuit and resume proper steady state operation.

The over-voltage sensing means is coupled to the input AC voltage line. In response to the input AC voltage exceeding an over-voltage threshold, the over-voltage sensing means generates an inhibit signal for inhibiting operation of components in the output of the switching power supply, thereby preventing component failure.

Figure 3:
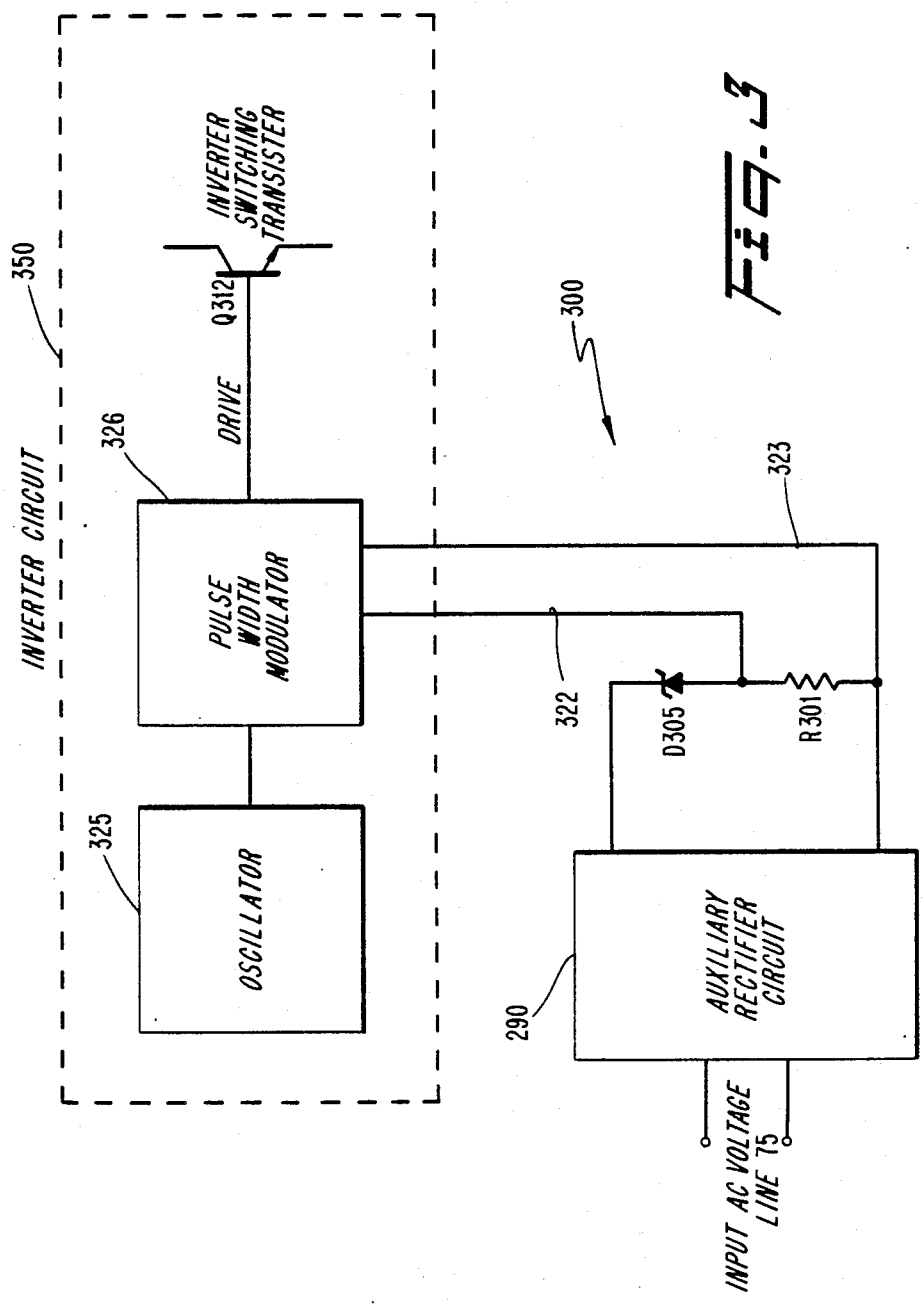
FIG. 3 is a schematic diagram of an embodiment of a circuit for sensing an over-voltage condition on an input AC voltage line.

The over-voltage sensing means may be embodied as an over-voltage sensing circuit 300, as illustrated in FIG. 3. While not limited to the following components, for illustrative purposes, consider the switching power supply 20 having the output of the rectifier and filter circuit coupled to an inverter circuit 350.

In the particular embodiment of the over-voltage sensing circuit 300, the over-voltage sensing circuit 300 is coupled to the input AC voltage line 75 through an auxiliary rectifier circuit 290. Across the output of the auxiliary rectifier circuit 290 is connected sixth resistor R301 in series with a second zener diode D305. The over-voltage sensing circuit 300 has an output including a pulse width control line 322 and common 323, connected to a pulse width modulator 326. The pulse width modulator 326 is connected between an oscillator 325 and at least one inverter switching transistor Q312. Pulse width modulator 326 varies the pulse width of pulses from oscillator 325 driving the base of inverter switching transistor Q312. The oscillator 325, pulse width modulator 326 and inverter switching transistor Q312 may be included as part of an inverter circuit 350.

The auxiliary rectifier circuit 290 and the over-voltage sensing circuit are designed so that during normal operation conditions, no current flows through sixth resistor R301 and second zener diode D305. Accordingly, there is no voltage across sixth resistor R301 and pulse width control line 322. Thus, pulse width modulator 326 operates in a normal condition with, for example, narrow pulses driving the base of inverter switching transistor Q312, thereby producing a voltage across the collector-emitter of inverter switching transistor Q312.

Further, the auxiliary rectifier circuit 290 and the over-voltage sensing circuit 300 are designed such that during abnormal operation conditions, the output of auxiliary rectifier circuit 290, which is proportional to the AC voltage from the input AC voltage line, causes current to flow through sixth resistor R301 and zener diode D305. Under this condition, pulse width control line 322 will have a voltage proportional to the current through sixth resistor R301. This voltage along the pulse width control line 322 is the inhibit signal. In response to a voltage along pulse width control line 322, pulse width modulator 326 decreases the pulse width of pulses driving the base of the inverter switching transistor Q312, thereby inhibiting operation of inverter circuit 350. This inhibit state will last during the cycle while the input AC voltage is in an over-voltage condition.

Thus, if the switching power supply 20 includes the inverter circuit 350, the inverter circuit 350 is protected from an over-voltage condition by the operation of the over-voltage sensing circuit 300. Essentially, during an over-voltage condition, second zener diode D305 operates to sense the over-voltage condition and cooperatively with pulse width modulator 326 vary the pulses driving the bases of inverter switching transistor 312 to place inverter switching transistor Q312 in an inhibit state. This operation happens almost instantaneously when an input over-voltage condition is sensed. By decreasing the pulse width, the voltage output of inverter switching transistor Q312 is reduced. The inverter switching transistor Q312 can be the main inverter switch of the inverter circuit 350. Thus, during this transient condition of input over-voltage, the transient is inhibited from the remainder circuitry and from causing damage to inverter circuit components.

Other circuits could be substituted for the over-voltage sensing circuit 300 shown in FIG. 3 without departing from the function of the over-voltage sensing means and the cooperation of the over-voltage sensing means with the other elements of the claimed invention.

It will be apparent to those skilled in the art that various modifications can be made to the circuit for automatically operating the switching power supply of the instant invention without departing from the scope or spirit of the invention, and it is intended that the present invention cover modifications and variations of the circuit provided they come within the scope of the appended claims and their equivalents.

I claim:

1. A circuit for automatically operating from two input voltage ranges, comprising:
   a switching power supply, the switching power supply being connected to an input AC voltage line and capable of operating from first and second input voltage ranges and having first and second nodes for changing the switching power supply from a first rectifier circuit when the first and second nodes are electrically connected to a second rectifier circuit when the first and second nodes are not electrically connected, the switching power supply having an inverter circuit with an output coupled to an output circuit;
   means coupled to the input AC voltage line and separate from said switching power supply, for rectifying an AC voltage to a DC voltage, wherein the DC voltage continuously varies proportionally with the AC voltage;
   level sensing means coupled to said rectifying means and responsive to the DC voltage for generating an output voltage;
   triac means coupled to said level sensing means and responsive to the output voltage for switching the switching power supply to the first rectifier circuit by electrically connecting the first and second nodes when the output voltage is at a predetermined level corresponding to when the AC voltage on the input AC voltage line is in the first input voltage range and for switching the switching power supply to the second rectifier circuit by electrically disconnecting the first and second nodes when the output voltage is at a predetermined level corresponding to when the AC voltage on the input AC voltage line is in the second input voltage range;
   delay means connected between said rectifying means and said level sensing means for setting the DC voltage sensed by said level sensing means at a level to set said triac means in an off condition when the switching power supply is initially turned on; and
   over-voltage sensing means coupled to the input AC voltage line and responsive to the input AC voltage exceeding an over-voltage threshold, for generating an inhibit signal for inhibiting operation of components in the output circuit and for protecting components in the output circuit from power abnormalities resulting in possible component failure when the switching power supply is operating with the second rectifier circuit from an input AC voltage from the second input voltage range and the AC voltage drops to a level in the first input voltage range causing triac means to switch the switching power supply to the first rectifier circuit and sequentially the AC voltage returns to the second input voltage range with the switching power supply operating with the first rectifier circuit and said triac means still in the on condition.

2. The circuit for automatically operating a switching power supply as set forth in claim 1 further comprising means coupled to the output of said level sensing means and to the input of said triac means and responsive to the output voltage, for isolating the triggering of said triac means.

3. The circuit for automatically operating a switching power supply as set forth in claim 1 or 2 wherein said rectifying means includes a full-wave rectifier circuit.

4. The circuit for automatically operating a switching power supply as set forth in claim 1 or 2 wherein said level sensing means includes:
   a bipolar transistor having a base; and
   first and second resistors connected in series across the output of said rectifying means, said first and second resistors being connected to said base.

5. The circuit for automatically operating a switching power supply as set forth in claim 1 or 2 wherein said triac means includes a triac having a trigger coupled to the output of said level sensing means, with said triac connected across the first and second nodes.

6. The circuit for automatically operating a switching power supply as set forth in claim 1 or 2 wherein said delay means includes a resistor and a capacitor connected in parallel.

7. The circuit for automatically operating a switching power supply as set forth in claim 2 wherein said isolating means includes an optically isolated triac driver.

8. A circuit for automatically operating a switching power supply, the switching power supply being connected to an input AC voltage line and capable of operating from first and second input voltage ranges and having first and second nodes for changing the switching power supply from a voltage doubler rectifier circuit when the first and second nodes are electrically connected to a first full-wave rectifier circuit when the first and second nodes are not electrically connected, said circuit comprising:

a second full-wave rectifier circuit connected directly to the input AC voltage line for rectifying an AC voltage to a DC voltage;

first, second and third resistors connected directly in series, with the series combination of said first, second and third resistors connected directly across the output of said second full-wave rectifier circuit;

a transistor having a base, emitter and collector, with the base connected to said first and second resistors;

a fourth resistor connected to the collector, and to said third resistor and said second full-wave rectifier circuit;

a zener diode connected to the emitter, and to said first resistor and said second full-wave rectifier circuit;

an optically isolated triac driver having first and second input terminals and third and fourth output terminals, with the first and second input terminals connected to the collector and emitter, respectively;

a fifth resistor connected to the third output terminal; and a triac having a trigger terminal and fifth and sixth terminals, with the trigger terminal connected to the fourth output terminal, the fifth terminal connected to the first node and said fifth resistor, and the sixth terminal connected to the second node.

9. A circuit for automatically operating a switching power supply, the switching power supply being connected to an input AC voltage line and capable of operating from first and second input voltage ranges and having first and second nodes for changing the switching power supply from a first rectifier circuit when the first and second nodes are electrically connected to a second rectifier circuit when the first and second nodes are not electrically connected, the switching power supply having an inverter circuit with an output coupled to an output circuit, said circuit comprising:

means coupled to the input AC voltage line and separate from said switching power supply for rectifying an AC voltage to a DC voltage, wherein the DC voltage continuously varies proportionally with the AC voltage;

level sensing means coupled to said rectifying means and responsive to the DC voltage for generating an output voltage;

triac means coupled to said level sensing means and responsive to the output voltage for switching the switching power supply to the first rectifier circuit by electrically connecting the first and second nodes when the output voltage is at a predetermined level corresponding to when the AC voltage on the input AC voltage line is in the first input voltage range and for switching the switching power supply to the second rectifier circuit by electrically disconnecting the first and second nodes when the output voltage is at a predetermined level corresponding to when the AC voltage on the input AC voltage line is in the second input voltage range;

delay means connected between said rectifying means and said level sensing means for setting the DC voltage sensed by said level sensing means at a level to set said triac means in an off condition when the switching power supply is initially turned on; and over-voltage sensing means coupled to the input AC voltage line and responsive to the input AC voltage exceeding an over-voltage threshold, for generating an inhibit signal for inhibiting operation of conponents in the output circuit and for protecting components in the output circuit from power abnormalities resulting in possible component failure when the switching power supply is operating with the second rectifier circuit from an input AC voltage from the second input voltage range and the AC voltage drops to a level in the first input voltage range causing triac means to switch the switching power supply to the first rectifier circuit and sequentially the AC voltage returns to the second input voltage range with the switching power supply operating with the first rectifier circuit and said triac means still in the on condition.

10. A circuit for automatically operating a switching power supply, the switching power supply being connected to an input AC voltage line and capable of operating from first and second input voltage ranges and having first and second nodes for changing the switching power supply from a voltage doubler rectifier circuit when the first and second nodes are electrically connected to a full-wave rectifier circuit when the first and second nodes are not electrically connected, the switching power supply including an inverter circuit, said circuit comprising:

means separate from said switching power supply for rectifying an AC voltage from the input AC voltage line to a DC voltage, wherein the DC voltage continuously varies proportionally with the AC voltage;

level sensing means responsive to the DC voltage and coupled to said rectifying means, for generating a first output voltage when the DC voltage falls below a predetermined level;

isolation means coupled to the output of said level sensing means and responsive to said first output voltage for generating a second output voltage;

triac means coupled to said isolation means and responsive to the second output voltage, for switching the switching power supply to the first rectifier circuit by electrically connecting the first and second nodes, thereby converting the power supply rectifier circuit to a power supply doubler circuit when the triac is in an on condition and for switching the switching power supply to the second rectifier circuit by electrically disconnecting the first and second nodes when the output voltage is at a predetermined level corresponding to when the AC voltage on the input AC voltage line is in the second input voltage range;

delay means connected between said rectifying means and said level sensing means for setting the DC voltage sensed by said level sensing means at a level to set said triac means in an off condition when the switching power supply is initially turned on; and over-voltage sensing means coupled to the input AC voltage line and responsive to the input AC voltage exceeding an over-voltage threshold, for generating an inhibit signal for inhibiting operation of components in the inverter circuit and for protecting components in the output circuit from power abnormalities resulting in possible component failure when the switching power supply is operating with the second rectifier circuit from an input AC voltage from the second input voltage range and the AC voltage drops to a level in the first input voltage range causing triac means to switch the switching power supply to the first rectifier circuit and sequentially the AC voltage returns to the second input voltage range with the switching power supply operating with the first rectifier circuit and said triac means still in the on condition.

11. The circuit for automatically operating a switching power supply as set forth in claim 9 or 10 wherein said rectifying means includes a full-wave rectifier circuit.

12. The circuit for automatically operating a switching power supply as set forth in claim 9 or 10 wherein said level sensing means includes:

a bipolar transistor having a base; and first and second resistors connected in series across the output of said rectifying means, said first and second resistors being connected to said base.

13. The circuit for automatically operating a switching power supply as set forth in claim 9 or 10 wherein said triac means includes a triac having a trigger coupled to the output of said level sensing means, with said triac connected across the first and second nodes.

14. The circuit for automatically operating a switching power supply as set forth in claim 9 or 10 wherein said delay means includes a resistor and a capacitor connected in parallel.

15. The circuit for automatically operating a switching power supply as set forth in claim 10 wherein said isolating means includes an optically isolated triac driver.

16. The circuit for automatically operating a switching power supply as set forth in claim 9 or 10 wherein said over-voltage sensing means includes a circuit having a zener diode for setting the over-voltage threshold.

* * * * *